US012473773B2

(12) United States Patent
Vautier

(10) Patent No.: US 12,473,773 B2
(45) Date of Patent: Nov. 18, 2025

(54) ACCESS DOOR TO A VEHICLE

(71) Applicant: Faiveley Transport Tours, Saint-Pierre-des-Corps (FR)

(72) Inventor: Fabien Vautier, Veretz (FR)

(73) Assignee: Faiveley Transport Tours, Saint-Pierre-des-Corps (FR)

(*) Notice: Subject to any disclaimer, the term of this patent is extended or adjusted under 35 U.S.C. 154(b) by 268 days.

(21) Appl. No.: 18/130,729

(22) Filed: Apr. 4, 2023

(65) Prior Publication Data

US 2023/0349223 A1 Nov. 2, 2023

(30) Foreign Application Priority Data

May 2, 2022 (FR) ....................................... 2204128

(51) Int. Cl.
*E05F 15/75* (2015.01)
*E05B 83/36* (2014.01)
*E05F 15/73* (2015.01)

(52) U.S. Cl.
CPC ........ *E05F 15/75* (2015.01); *E05F 2015/765* (2015.01); *E05Y 2400/508* (2013.01);
(Continued)

(58) Field of Classification Search
CPC ................ E05F 15/75; E05F 2015/765; E05F 15/652; E05F 15/659; E05F 15/73; E05F 15/43;
(Continued)

(56) References Cited

U.S. PATENT DOCUMENTS 5,373,120 A * 12/1994 Barrett .................... B66B 13/08 187/316
5,680,409 A * 10/1997 Qin .......................... G05B 9/02 702/116
(Continued)

FOREIGN PATENT DOCUMENTS

DE 102019209522 A1 12/2020
EP 3882104 A1 * 9/2021 ............. B61D 19/02
(Continued)

OTHER PUBLICATIONS

French search report for corresponding French patent application No. 2204128 (2 pages).

*Primary Examiner* — Rachid Bendidi
*Assistant Examiner* — Irene C Khuu
(74) *Attorney, Agent, or Firm* — K&L Gates LLP

(57) ABSTRACT

At least one leaf of this door is equipped with a detection device comprising a mechanical detection device and a contactless sensor each capable of detecting a presence. The control circuit board comprises a control unit for movement of each leaf and a diagnostic unit, while means transfer, from the detection device in the direction of the diagnostic unit and the control unit, a first item of information representative of the activation state of the mechanical device, and a second item of information representative of the activation state of the contactless sensor. The diagnostic unit can identify a malfunction at least of the contactless detection device, when the first item of information has an active value while the second item of information has an inactive value. The invention allows redundancy to improve the availability of the detection device, while performing predictive maintenance for the operator, in particular a malfunction of the contactless sensor.

15 Claims, 4 Drawing Sheets

(52) U.S. Cl.
CPC ..... *E05Y 2400/86* (2013.01); *E05Y 2800/246* (2013.01); *E05Y 2900/506* (2013.01); *E05Y 2900/51* (2013.01); *E05Y 2900/531* (2013.01)

(58) Field of Classification Search
CPC ..... E05F 15/40; E05F 15/00; E05F 2015/434; E05F 2015/767; E05F 15/632; E05F 15/76; E05F 15/60; E05F 15/611; E05F 15/643; E05F 15/655; E05F 15/70; E05F 2017/005; E05F 15/42; E05F 15/608; E05F 15/622; E05F 2015/433; E05F 2015/483; E05F 15/605; E05F 5/022; E05Y 2400/508; E05Y 2400/86; E05Y 2800/246; E05Y 2900/506; E05Y 2900/51; E05Y 2900/531; E05Y 2400/502; E05Y 2400/852; E05Y 2400/854; E05Y 2800/22; E05Y 2900/508; E05Y 2400/44; E05Y 2400/45; E05Y 2400/54; E05Y 2900/132; E05Y 2400/458; E05Y 2400/812; E05Y 2400/82; E05Y 2800/40; E05Y 2400/50; E05Y 2400/504; E05Y 2900/50; E05Y 2900/518; E05Y 2400/512; E05Y 2400/53; E05Y 2400/532; E05Y 2400/61; E05Y 2400/612; E05Y 2400/65; E05Y 2400/814; E05Y 2400/822; E05Y 2400/85; E05Y 2800/21; E05Y 2201/20; E05Y 2201/622; E05Y 2400/10; E05Y 2400/445; E05Y 2400/851; E05Y 2800/30; E05Y 2800/404; E05B 83/363; E05B 81/76; E05B 81/77; E05B 2047/0067; E05B 81/12; E05B 81/86; E05B 81/90; E05B 81/56; E05B 63/24; E05B 2047/0048; E05B 17/0083; B61D 19/02; B61D 19/00; B61L 15/0081; B61L 15/0072; B61L 15/009; B61L 15/0045; B61L 23/041; B61B 1/02; G06F 3/0304; G06F 3/044; H03K 17/941; H03K 2217/94112; H03K 2217/94036; H03K 2217/94108; H03K 2217/94116; H03K 17/18; H03K 17/78; H03K 17/968; H03K 2217/94052; B60K 2360/146; B60K 35/10; B60Q 1/324; B60Q 1/50; B60Q 5/005; B60Q 1/543; G07C 9/00; G07C 9/38; G07C 2009/00769; B60R 16/0231; B60R 2021/0067; B60R 2300/30; B60R 2300/105; G05B 23/0221; G05B 15/02; G01D 5/145; B60J 5/0477; B60J 5/06; B60J 5/0497; G06T 7/254; G06T 11/60; G06T 7/70; G06T 2207/30196; G08B 13/19602; G08B 13/19606; G08B 13/19641; G08B 13/19647; B60W 2420/40; B60W 2050/143; B61C 17/00; E05C 17/006; H04L 67/12; B62D 25/04; E06B 2009/6836; E06B 9/88; E06B 9/68; E06B 3/481; G01S 11/12; G01S 11/14; G01S 3/784; G01S 5/0247; G01S 5/16; G01S 5/186
See application file for complete search history.

(56) References Cited

U.S. PATENT DOCUMENTS

| | | | | |
|---|---|---|---|---|
| 10,361,880 | B1 * | 7/2019 | Marcinkowski | G07C 9/32 |
| 2005/0183489 | A1 * | 8/2005 | Weinberg | G01D 3/08 73/1.01 |
| 2006/0187037 | A1 * | 8/2006 | Eubelen | E05F 15/43 340/552 |
| 2010/0060264 | A1 * | 3/2010 | Smith | G01P 3/488 324/202 |
| 2011/0242356 | A1 * | 10/2011 | Aleksic | H04N 13/161 348/222.1 |
| 2012/0159853 | A1 * | 6/2012 | Mickelson | E05F 15/638 49/350 |
| 2015/0094988 | A1 * | 4/2015 | Schumacher | G01M 99/00 702/188 |
| 2016/0007101 | A1 * | 1/2016 | Straeussnigg | G08C 15/02 340/870.19 |
| 2016/0189460 | A1 * | 6/2016 | Watanabe | G05B 15/02 700/275 |
| 2019/0128040 | A1 * | 5/2019 | Mitchell | E05F 15/43 |
| 2020/0024885 | A1 * | 1/2020 | Dreyer | E05F 15/73 |
| 2021/0090427 | A1 * | 3/2021 | Hass | G08B 25/007 |
| 2021/0396065 | A1 * | 12/2021 | Hara | B61L 15/0081 |
| 2023/0349223 | A1 * | 11/2023 | Vautier | E05F 15/659 |

FOREIGN PATENT DOCUMENTS

| | | | |
|---|---|---|---|
| EP | 3929057 | A1 | 12/2021 |
| WO | 2021185908 | A1 | 9/2021 |

* cited by examiner

ACCESS DOOR TO A VEHICLE

CROSS-REFERENCE TO RELATED APPLICATIONS

This application claims priority to French patent application no. 2204128 (filed 2 May 2022), the entire disclosure of which is incorporated herein by reference.

TECHNICAL FIELD

The present invention relates to the field of access doors to a transport vehicle. These access doors can designate doors belonging to transport vehicles, of the train, tram, metro, trolleybus or even bus type. Within the meaning of the invention, these access doors also designate so-called landing doors, also called platform screen doors. The invention relates to a transport vehicle door which may comprise either a single leaf or several leaves, typically two leaves. In addition, these access doors can be the sliding type, even swinging-sliding, or oscillating.

The present invention relates more specifically to an access door which comprises means for assessing the proper functioning of a mechanical member of the push-button type, which makes it possible to detect the presence of passengers in the vicinity of the door. It also relates to a method for implementing this access door, including an assessment phase of this detection device. The invention finally relates, on the one hand, to a transport vehicle, on the other hand, to a platform screen door, which are respectively equipped with at least one such access door.

STATE OF THE ART

Conventionally, a transport vehicle access door comprises a frame, as well as an opening formed by at least one leaf. The latter is movable relative to the fixed frame between a closed position, in which this leaf closes off an opening formed in the fixed frame, as well as an open position in which it frees access to this opening. This leaf is likely to be set in motion, typically by an electric motor activated by means of a control circuit board.

This board receives information from a detection device, which signals the presence of passengers wishing to open or, on the contrary, close the door. Conventionally, this detection device is in the form of a push-button. When a passenger wishes to control the opening of the leaf, to enter the vehicle or to leave it, he/she presses this push-button. The information is then transmitted to the control circuit board which passes it on to the motor, thus causing the leaf to move.

This solution, of a purely mechanical type, does, however, have certain drawbacks. Indeed, such a push-button may be subject to electronic failures. In addition, its proper functioning can be affected by the presence of water. The need to press the button mechanically can also be inconvenient for travelers carrying bulky objects, or even for people with reduced mobility. Finally, this first solution is not satisfactory from a hygienic point of view since the push-button is regularly in contact with the hands of many users, which is a vector for the transmission of viruses or bacteria.

To remedy these various drawbacks, the use of "contactless" detection devices has been proposed, which can be activated without being pressed by the user. Structurally, a sensor is generally provided that can detect a presence, that of a user's hand, in the vicinity of this sensor. In the event of detection, this sensor then transmits the information to the control circuit board, so that the leaf can be moved. However, this type of contactless sensor is not very commonly used. In addition, it may be subject to electronic failures. Finally, these sensors can deliver inaccurate information, in particular false detections, especially in the event of fog or if they are subject to glare.

WO 2021/185908 also describes a door equipped with both a mechanical detection device and a contactless detection device. The control circuit board in this door receives initial item of information when in operation that is representative of the activation state of the mechanical device, as well as a second item of information representative of the activation state of the contactless sensor.

It is understood that the correct operation of the detection devices is essential for the smooth operation of a transport vehicle and, in general, of the entire network. Indeed, a possible malfunction inevitably leads to a temporary shutdown of the transport vehicle. This results in an untimely delay, as well as an inconvenience likely to affect all traffic.

BRIEF SUMMARY

In view of the foregoing, one objective of the present invention is to overcome, at least partially, the drawbacks of the prior art mentioned above.

Another objective of the invention is to provide an access door to a transport vehicle which, while offering additional detection possibilities with regard to the prior art, provides an analysis of the detection device fitted to this door.

Another objective of the invention is to provide such an access door, which makes it possible to indicate to the operator any risks of breakdowns likely to affect the detection device, in the short or medium term.

Another object of the invention is to provide such an access door, the structure of which does not undergo any significant modification compared with existing doors, in particular as regards its control circuit board.

According to the invention, at least one of the above objectives is achieved by means of an access door to a transport vehicle (300), such as the train, tram, metro, trolleybus or even bus type, this door access including:

- a frame (10) delimiting an opening (304),
- an opening comprising at least one leaf (20, 25), each leaf being movable between an opening position of the opening, corresponding to a free passage through this opening, as well as a closing position of this opening, the inner side (24) of at least one leaf and/or the outer side (22) of at least one leaf, in particular both the inner side and the outer side of a single leaf (20), being equipped with a detection device (3; 103; 203). Each detection device comprising:

- a mechanical detection device (32; 132; 232) capable of detecting a pressure on the detection device, and
- a contactless sensor (34; 134; 234) capable of detecting a presence in the vicinity of the detection device, this presence being accompanied or not by pressure on the detection device,
- a control circuit board (6; 106; 206), comprising a control unit (60; 160; 260) configured to control the movement of the or each leaf,
- transfer means (4.5; 104,105; 204) which are capable of transferring the initial item of information (I; III; V), representative of the activation state of the mechanical device, as well as a second item of information (II; IV; VI), representative of the activation state of the contactless sensor, from the detection device towards the control unit, each of the said items of information possessing a so-called active value (I(1)-VI(1)) and a so-called inactive value (I(0)-VI(0)).

The door is characterized in that the control circuit board (6; 106; 206) further comprises a diagnostic unit (70; 170; 270) toward which the initial item of information (I; III; V) and the second item of information (II; IV; VI) are capable of being transferred from the detection unit.

The diagnostic unit is configured to identify a malfunction of at least the contactless sensor when the initial item of information has an active value (I(1); III(1); V(1)) while the second item of information has an inactive value (II(0); IV(0); VI(0)).

The transfer means includes a first transfer line (4; 104) capable of conveying a first electrical signal (S1; S'1) carrying the initial item of information (I; III), representative of the activation state of the mechanical device (32; 132), from the detection unit (3; 103) toward both the control unit (60; 160) and the diagnostic unit (70; 170). The transfer means also may include a second transfer line (5; 105), separate from the first transfer line. This second line can convey a second electrical signal (S2; S'2) that carries the second item of information (II; IV). The second item of information represents the activation state of the contactless sensor (34; 134), from the detection device (3; 103) in the direction of both the control unit (60; 160) and the diagnostic unit (70; 170). The active value of each item of information corresponds to a peak of a respective electrical signal. The diagnostic unit (70; 170) is configured to compare, for a predetermined period, the first electrical signal with the second electrical signal. The first signal (I) corresponds only to the activation state of the mechanical device, while the second signal (II) corresponds only to the activation state of the contactless sensor. The first transfer line (4) only connects the mechanical detection device (32) with both the control unit (60) and the diagnostic unit (70), while the second transfer line (5) only connects the contactless sensor (34) with both the control unit and the diagnostic unit. The first signal (III) corresponds only to the activation state of the mechanical device (132), or only to the activation state of the contactless sensor, while the second signal (IV) corresponds to the activation state of the mechanical device and/or of the contactless sensor (134). The first transfer line (104) connects only the mechanical detection device (132), or alternatively the contactless sensor, with both the control unit (160) and the diagnostic unit (170), while the second transfer line (105) connects both the mechanical detection device and the contactless sensor (134), with both the control unit and the diagnostic unit. The transfer means includes a single transfer line (204) capable of conveying a single electrical signal (S"), carrying both the initial item of information (V) and the second item of information (VI), from the detection device (203) toward both the control unit (260) and the diagnostic unit (270). The single transfer line (204) connects both the mechanical detection device (232) and the contactless sensor (234), with both the control unit (260) and the diagnostic unit (270). The diagnostic unit (270) can identify two different signatures (M1, M2) carried by said single signal, in particular different patterns, with each signature corresponding to the active value (V(0), VI(0)) of a respective item of information (V, VI). The control circuit board further comprises a malfunction module (80; 180; 280). The diagnostic unit can transmit information to this malfunction module, in the event that the diagnostic unit identifies a malfunction of the contactless sensor. The control circuit board also includes an alert (86) perceptible to the operator. The malfunction module can activate the alert. The control circuit board further comprises a memory module (90; 190; 290). The diagnostic unit can supply this memory module with occurrences relating to an activation of the contactless sensor accompanied by a lack of activation of the mechanical device.

These additional features can be implemented with the main object above, individually or in any technically compatible combination.

The invention also relates to a method for implementing an access door above, in which the initial item of information (I; III; V), representative of the activation state of the mechanical device, as well as the second item of information (II; IV; VI), representative of the activation state of the contactless sensor, are transferred from the detection device to both the diagnostic unit and the control unit, and a malfunction of the contactless sensor is identified on the assumption that the first and second signals indicate activation of the mechanical device, but on the other hand an absence of activation of the contactless sensor.

According to other characteristics of the method of implementation in accordance with the invention, the operator is alerted after a predetermined number of malfunctions of the contactless sensor.

The variation, as a function of time, of the ratio (PM) is analyzed between, on the one hand, the number of activations of the contactless sensor accompanied by an absence of activation of the mechanical device and, on the other hand, the total number of activations of the contactless sensor. A malfunction in the mechanical device is deduced if the ratio reaches a zero value, while decreasing according to a gradient greater than a predetermined value.

These additional features can be implemented with the second main object above, individually or in any technically compatible combinations.

The invention also relates to a transport vehicle, such as the train, tram, metro, trolleybus or even bus type. The vehicle comprising at least one door as described above.

The invention finally relates to a platform screen door for a transport vehicle, in particular of the train, tram, metro, bus or even trolleybus type, this platform screen door comprising at least one door as above.

In accordance with the invention, a detection device is provided which is equipped with two types of detection devices. The detection device includes a first device of a mechanical nature, detecting physical pressure, as well as a second element of a contactless nature, capable of detecting a presence without however requiring physical contact. This redundancy makes it possible to improve the availability of the detection device according to the invention, since the possible failure of one of the detection devices can be compensated for by the proper functioning of the other device.

Furthermore, the invention provides an additional analytical functionality in addition to the combination of the above functions. In other words, predictive maintenance is carried out which makes it possible to draw the operator's attention, either to an immediate malfunction of the contactless sensor, or to a potential failure of the mechanical device.

It is understood first that, if the user presses the mechanical detection device, the user also theoretically activates the contactless sensor. In fact, the path of the user's hand, coming into contact with the mechanical device, necessarily crosses the detection zone of the contactless sensor. Consequently, if only the mechanical device is activated, but not the contactless sensor, a malfunction of this contactless sensor can be identified immediately.

This analysis provides valuable information for the operator. Indeed, if the analysis in accordance with the invention is not carried out, the detection device can continue to be operational since the mechanical detection device of the detection device is still functioning. Nevertheless, this detection device is partially faulty and is therefore at the mercy of a failure of the mechanical device, which would render the detection device totally inoperative and would cause the vehicle to come to a complete stop. Consequently, it can be particularly advantageous for the operator to intervene immediately, to repair or replace the contactless sensor before the mechanical device in turn suffers a breakdown.

Conversely, if the contactless sensor is activated without the activation of the mechanical device, it cannot be immediately concluded that there is a malfunction in this mechanical device. Indeed it is possible that a user may activate the contactless sensor without contacting the mechanical device, so that the absence of activation of the latter is completely normal. As will be seen in more detail in the following description, different analytical modes can therefore be envisaged.

DESCRIPTION OF FIGURES

The invention will be described below, with reference to the accompanying drawings, given solely by way of non-limiting examples, in which.

DETAILED DESCRIPTION

Figure 1:
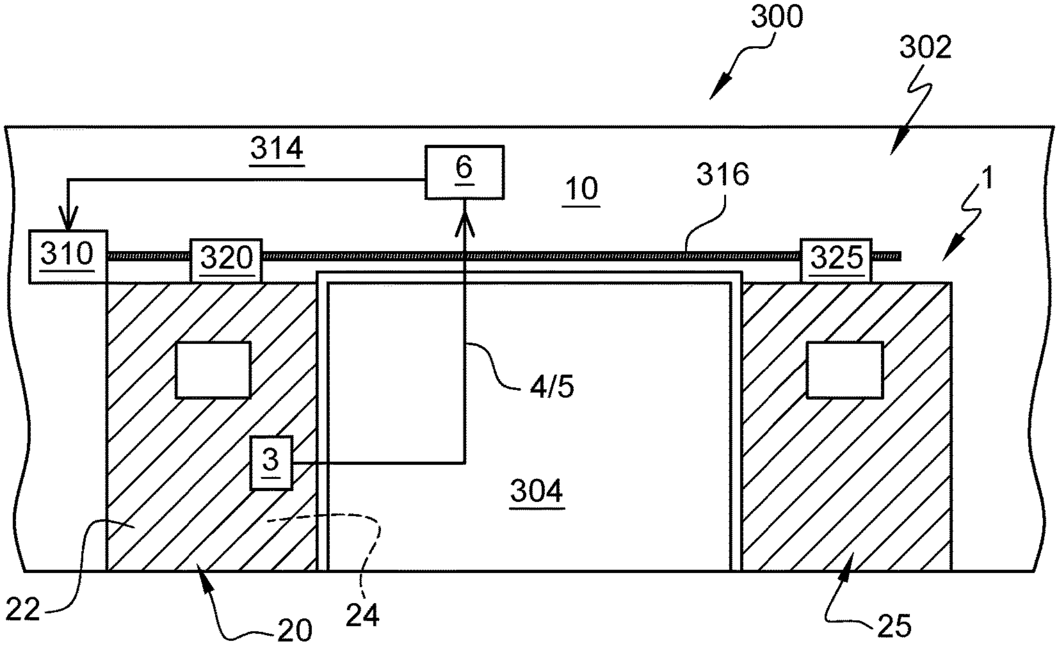
FIG. 1 is a front view, schematically illustrating a section of a transport vehicle equipped with an access door according to the invention.

The following references are used in this description:

300 transport vehicle

302 vehicle body section

304 opening

310 motor

314 control line

316 auger

320, 325 driven parts attached to the leaves

FIGS. 1 to 8: 1 access door; 10 frame of this door; 20, 25 leaves of this door; 22,24 exterior and interior sides of the leaves; 3 detection device; 30 housing; 32 mechanical detection device; 34 contactless detection device; 36 hand; 38 detection area; 4.5 transfer lines; 41.42, 51.52 downstream branch lines; 6 control circuit board; 60 control unit; 70 diagnostic unit; 72 analysis module; 78.88 lines to 80.90; 80 malfunction module; 82 processor; 84 line; 86 alert; 90 memory module; 92 processor; 94 line; 96 alert; 40), II(0), I(1), II(1) respectively inactive and active values of I, II; S1, S2 electrical signals; C1 to C3 curves in FIG. 8; C31, C32 zones of C1; C' C'S gradient of the curve and threshold value; PS threshold value.

FIGS. 9 to 14: same references as FIGS. 1 to 8 increased by 100; III(0), IV(0), III(1), IV(1) inactive and active values of III, IV; S'1, S'2 electrical signals; 153, 154 branch lines upstream of 105; C'2 preliminary peak of S'2.

FIGS. 15 to 18: same references as FIGS. 1 to 8 increased by 200; V(1), VI(1) active values of V, VI; S" single electrical signal; 243, 244 branch lines upstream of 204; M1, M2 patterns of signal S"

FIG. 1 illustrates, schematically and partially, a transport vehicle 300 which may be for example a train, a tram, a metro, a bus or even a trolleybus. FIG. 1 only shows a simplified section of the body 302 of this vehicle. This figure also illustrates an access door according to the invention, designated by the reference 1, which equips this transport vehicle 300.

In a manner known per se, this door comprises a frame 10, arranged at the periphery of an opening 304 made in the body of the vehicle. This door is further provided with two leaves 20 and 25 forming an opening. Each leaf 20, 25 is movable between the respective opening and closing positions of the opening 304. As a variant, this door can be provided with a single leaf or with several leaves. In the example shown, this door is of the sliding type, it being understood that it may be of a different type, in particular sliding-swinging. Conventionally, the opening 304 delimits a free passage for users, in the open position of each leaf.

FIG. 1 also illustrates means allowing each leaf to be driven relative to the frame, in a direction which corresponds to the rolling axis of the vehicle. These drive devices firstly comprise a motor 310 of any suitable type, for example electric. This motor is controlled by a board 6, via a control line 314. This motor cooperates with a drive device, for example of the endless screw type 316, which is integral in translation with the frame. A so-called driven device 320 and 325 is also provided, integral with a respective leaf 20 and 25. Each driven device is for example made in the form of a cylindrical body, the inner surface of which forms a nut intended to cooperate with the endless screw above. The various mechanical devices listed above may be of the conventional type and will therefore not be described in greater detail below.

Figure 2:
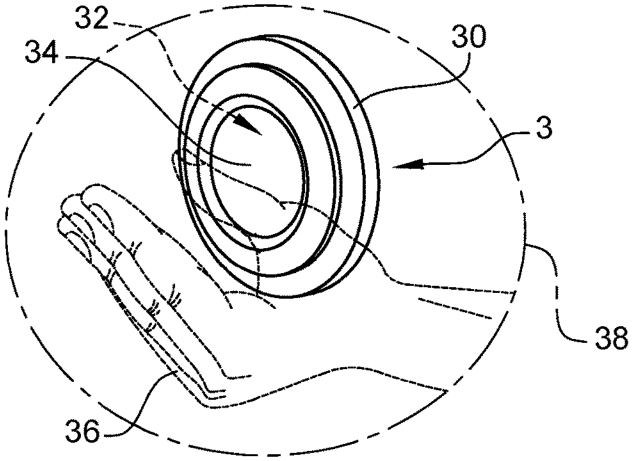
FIG. 2 is a perspective view, on a larger scale, illustrating the structure and operating principle of a detection device fitted to a leaf of the access door in FIG. 1.

We will now describe in greater detail the detection devices, in accordance with the invention, which equip the door 1 above. FIG. 2 shows a detection device 3 which is provided on the outer side 22 of the leaf 20 shown in FIG. 1. It should be understood, as will be detailed below, that another detection device generally equips the inner side 24 of this same leaf 20. On the other hand, the other leaf 25 does not conventionally comprise a detection device, either on inner or outer sides of the other leaf 25.

As shown in FIG. 2, the detection device 3 comprises a housing 30 fixed to the leaf by any appropriate means. This housing firstly supports a mechanical detection device of the push-button type. This standard mechanical device is represented schematically by being allocated reference 32. The detection device 3 is further equipped with an additional detection device 34, also illustrated schematically, which is referred to as "contactless" or "touchless."

This contactless detection device 34 is suitable for detecting the presence of a user's hand 36, visible in this FIG. 2, inside a so-called detection zone 38. It can be of any appropriate type, such as optical, capacitive, or even thermal. This so-called "contactless" device 34 is typically a sensor operating on the known "time of flight" principle. As shown in this FIG. 2, this sensor can react to movements of a hand 36 which can be exerted in different directions, such as in particular a sweeping of the hand.

Figure 3:
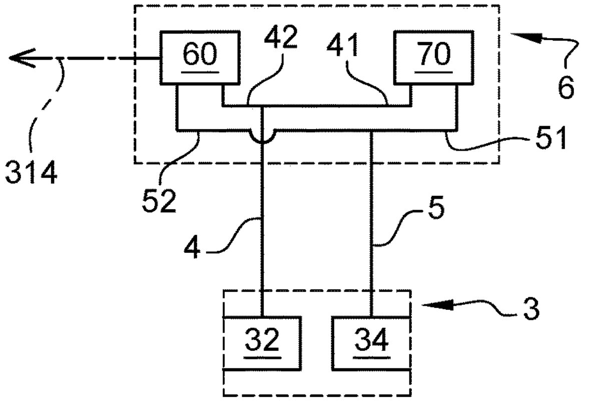
FIG. 3 is a schematic view, illustrating a first alternative embodiment of the detection device and the control circuit board of this access door, as well as the various lines allowing the transfer between the detection device and the board.

The contactless sensor 34 is connected to the control circuit board 6, by transfer lines 4 and 5, which are shown schematically in FIG. 1 but will be described in greater detail below. As can be seen in FIG. 3, the control circuit board 6 comprises a control unit 60, which is conventionally adapted to activate the control line 314, with a view to moving the door. In accordance with the invention, the board 6 also is equipped with a diagnostic unit 70, the structure of which will be detailed with reference to FIG. 4. These units 60 and 70 are placed in parallel, with reference to transfer lines 4 and 5.

More precisely, the first line 4, which is dedicated solely to the transfer of information concerning the mechanical detection device 32, extends only from the latter. Furthermore, the second transfer line 5, which is dedicated solely to the transfer of information relating to the contactless detection device 34, extends only from the latter. Each line 4 and 5, called the main line, is divided into two downstream lines, called branch lines, mutually placed in parallel. Thus line 4 is divided into a line 42 in communication with the control unit 60, as well as a line 41 in communication with the diagnostic unit 70. Similarly line 5 is divided into a line 52 in communication with the control unit 60, as well as a line 51 in communication with the diagnostic unit 70.

Figure 4:
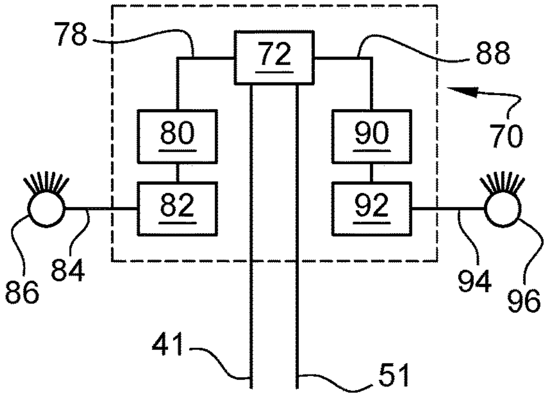
FIG. 4 is a schematic view, illustrating on a larger scale the structure of the control circuit board.

Referring now to FIG. 4, the diagnostic unit 70 firstly comprises a main so-called analysis module 72, which is more particularly adapted to process the signals received from the transfer lines 4 and 5. This analysis module 72 is connected directly with lines 41 and 51 above, delivering the information of mechanical and contactless origin respectively. Furthermore, this analysis module 72 is connected, via a line 78, to a malfunction module 80. The latter is associated with a processor 82 which can activate, via a line 84, an alert 86 for example of a visual and/or auditory type, which can be perceived by the operator of the vehicle.

Finally, the analysis module 72 is connected, via a line 88, to a memory module 90. The information stored in this module 90 can be managed in several ways. Thus the module 90 can be associated with an additional processor 92 which can activate, via a line 94, an additional alert 96. It is also possible, additionally or alternatively, to query this memory module, using any appropriate means such as a maintenance center. Such a query, which can be implemented on site or remotely, will be periodically carried out.

In the standard operation of the invention, an initial item of information I, said to be representative of the activation state of the mechanical detection device 32, is transferred between the detection device and the control circuit board, as well as a second item of information II, said to be representative of the activation state of the contactless sensor 34. In the present variant, illustrated with reference to FIGS. 3 to 8, each item of information I and II corresponds to the activation state of a single detection device, respectively mechanical or contactless. On the other hand, neither item of information considers the activation state of the other device, respectively contactless or mechanical.

In this variant, each item of information I and II is carried by a respective electrical signal S1 and S2. Depending on whether the mechanical device 32 is activated or not, information I has two values which are called "active" and "inactive." These values, allocated references I(1) and I(0) in the figures, correspond respectively to peaks and troughs of the signal S1. Depending on whether the contactless sensor 34 is activated or not, information II similarly possesses two active and inactive values, allocated references II(1) and II(0), corresponding respectively to peaks and troughs of the signal S2.

As seen above, the control unit 60 is connected both with the so-called mechanical line 42 and with the so-called contactless line 52. As soon as at least one detection device 32 or 34 is activated, each corresponding electrical signal S1 or S2 passes to its peak value, and the respective information I or II passes to its active value. The control unit 60 then recognizes this situation, so that it initiates the opening of the door in the conventional manner, via the control line 314.

Figure 5:
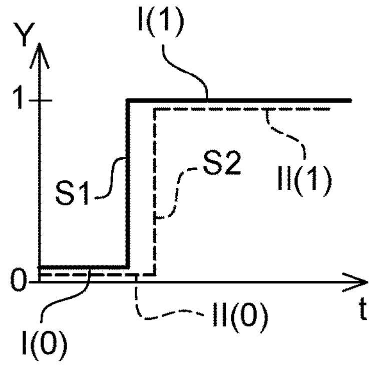
FIG. 5 is a graph, illustrating signals relating to a type of operation of the detection device, corresponding to both its contactless and its mechanical activation.

With regard to the diagnostic unit 70, four different operational cases can be distinguished, three of which will be detailed with reference to FIGS. 5 to 7. In these figures the first signal I, called mechanical, is illustrated in solid lines while the second signal II, called contactless, is illustrated in dotted lines. The peak amplitudes of these electrical signals are identical: nevertheless, to distinguish more clearly between them, they have been represented slightly differently in the figures.

The first of these cases, which is not shown in the figures, corresponds to an absence of activation, both the mechanical device 32 and the contactless sensor 34. In this case, each electrical signal S1 and S2 has its trough value, so that each item of information I and II retains its inactive value. This means that no action is exerted on the detection device, by any user. This occurrence does not call for any particular alert, vis-à-vis the operator of the transport vehicle.

The second case corresponds to the activation of both the mechanical device 32 and the contactless sensor 34. In practice, this corresponds to the normal use of the detection device, in which the user activates the mechanical device by exerting pressure on the latter. To do so, the user first crosses the detection zone 38 of the contactless sensor, so that he/she also activates the latter. Referring to FIG. 5, this situation is brought about by the passage of the electrical signals S1 and S2 to their peak values, such that items of information I and II now have active values 41) and II(1). The appearance of this type of signal indicates correct operation of the detection device, both at the contactless and mechanical level. As in the first case above, the control circuit board does not send any alert to the operator.

Figure 6:
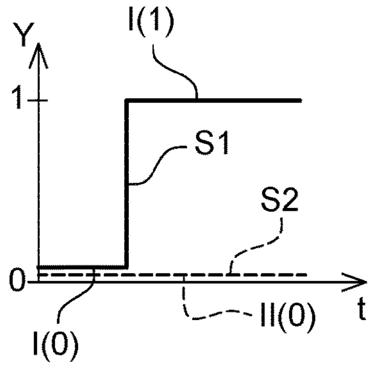
FIG. 6 is a graph, similar to FIG. 5, illustrating signals relating to another type of operation of the detection device, corresponding to mechanical activation but to an absence of contactless activation.

The third case corresponds, in FIG. 6, to the appearance of a single peak in the electrical signal S1 relating to the mechanical device, while the other electrical signal S2 remains at its trough value. Under these conditions, information I has an active value of I(1), while information II has an inactive value of II(0). The analysis module then identifies, by any appropriate conventional means of comparison between the signals, an activation of the mechanical device as well as an absence of activation of the contactless sensor. It concludes that the contactless detection device is malfunctioning, which leads to a message being sent to the malfunction module 80.

As explained above, the identification of this malfunction can be explained by the fact that, when the mechanical device is activated, the user necessarily passes his/her hand in the detection field of the contactless sensor. Consequently, the absence of activation of the contactless sensor, during an activation of the mechanical device, implies that the contactless sensor is not functioning correctly.

The above situation, corresponding to the signals in FIG. 6, can be handled in several ways. It can first be decided that the malfunction module 80 activates alert 86 perceptible by the operator, from the first occurrence of this malfunction. It can also be decided that this alert is not activated immediately, but only when a predetermined number of malfunctions of this type have occurred.

Figure 7:
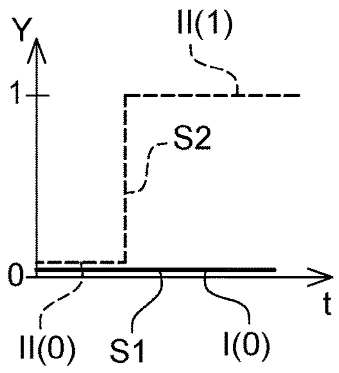
FIG. 7 is a graph, similar to FIG. 6, illustrating signals relating to yet another type of operation of the detection device, corresponding to contactless activation but to an absence of mechanical activation.

The fourth case corresponds, in FIG. 7, to the appearance of a single peak in the electrical signal S2 relating to the contactless sensor, while the other electrical signal S1 remains at its trough value. Under these conditions, information I has an inactive value of I(0), while information II has an active value of II(1). The analysis module then identifies, by a comparison between the signals which is analogous to that implemented in the third case above, an absence of activation of the mechanical device as well as an activation of the contactless sensor.

Unlike the third case above, the analysis module cannot necessarily conclude that the mechanical detection device is malfunctioning. Indeed, two alternative situations can be envisaged in the case of FIG. 7. It is first possible that the user wishes to activate the detection device, without contacting the latter. In this first situation, the user activates the contactless sensor without activating the mechanical device, so that the inactive value of the information I is not synonymous with a possible mechanical failure. It is also possible that the user has pressed the detection device, to open or close the leaf. In this second situation, the user has therefore theoretically activated the mechanical device, so that the inactive value of information I a priori leads to the conclusion that the mechanical device is malfunctioning.

According to an advantageous variant of the invention, the situations compliant with this fourth case can be managed by using the memory module. The analysis module provides the memory module with the nature of the various activations of the detection devices, both mechanical and contactless. If the contactless sensor works correctly, there are only two possibilities: on the one hand, the activation of the contactless sensor accompanied by the activation of the mechanical device, i.e. the appearance of the values (1) and II(1) in FIG. 5, on the other hand the activation of the contactless sensor without activation of the mechanical device, i.e. the appearance of the values I(0) and II(1) in FIG. 7.

Figure 8:
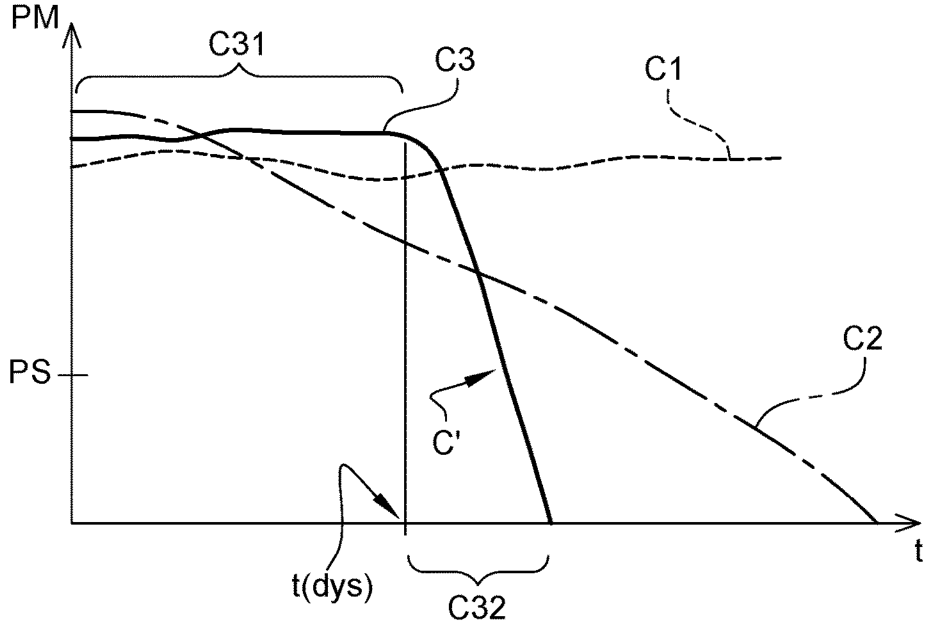
FIG. 8 is a graph, illustrating several variations over time of the number of mechanical activations, for the type of operation of FIG. 7.

From the compilation of these various items of information, the memory module can provide a graph, such as that of FIG. 8, illustrating the variation in the percentage of mechanical activation (PM). This percentage corresponds to the ratio between, on the one hand, the number of activations of the mechanical device and, on the other hand, the total number of activations of the detection device. In other words, a PM percentage of 100 means that the mechanical device is always activated, a value of 0 of this same percentage means that the mechanical device is never activated, while a value of 50 means that this mechanical device is activated every other time.

FIG. 8 represents a first possibility in which this PM percentage is certainly not constant over time, but without however undergoing significant variations. It can therefore be concluded, at first glance, that mechanical detection device 32 is functioning correctly. This situation is represented by the curve C1, in dotted lines.

In this same FIG. 8, a second possibility has been illustrated in which the PM percentage decreases regularly over time. This possibility, represented by curve C2 in dashed lines, does not however make it possible to conclude that there is a malfunction of mechanical device 32. It can therefore be assumed that, over time, users tend to favor contactless detection alone, to the detriment of mechanical detection.

Finally, curve C3, in solid lines in FIG. 8, illustrates a third possibility. There is a first zone C31, in which the PM percentage varies very little, as in the case of curve C1 above. Then, in a second zone C32, this same percentage decreases sharply until it reaches a value close to or equal to zero. In this situation, we can conclude on an initial basis that there is a malfunction in the mechanical detection device, at time t (dys), corresponding to the drop in the PM percentage. Zone C32 in this FIG. 8, indicating the appearance of the failure, can be vertical if this failure is sudden. This zone may have another profile, different from the vertical, if the failure occurs intermittently.

From these different situations in FIG. 8, it is also possible to initiate certain types of alert for the vehicle operator. The first situation represented by curve C1 does not require any particular alert since, as we have seen above, a priori, it indicates correct operation. On the other hand, in the case of a drop in the PM percentage, which can be regular or sudden, the merits of an alert can be considered. It is advantageous to be able to determine whether the second or third possibility above is applicable, in order to provide the appropriate information to the operator.

The control circuit board may include a processor capable of analyzing the PM percentage variation curves, in order to identify the present type of situation. For example the processor could calculate at any moment in time an instantaneous value C' of the gradient of the curve PM, corresponding to the derivative of the curve PM=f(t). If the processor identifies that this instantaneous value C' is greater than a predetermined threshold value C'S, it will conclude that there is a particularly rapid drop in the value of PM, representative of a malfunction. A first possibility then consists in immediately providing the corresponding information to the operator, via alarm 96. The operator can then carry out all the appropriate operations, typically repair or replace the mechanical detection device. As an alternative, it is possible to store this information in the memory module which, as seen above, can be consulted periodically by the operator.

On the other hand, the processor could detect that the curve PM=f(t) passes below a threshold value PS, illustrated in FIG. 8, without however the derivative being greater than the value C'S. In this case, it will conclude that mechanical detection is neglected by users, without however there being a malfunction in mechanical device 32. Typically, this situation is not immediately communicated to the operator. It will be stored in the memory module, so that it can be retrieved in good time by the operator.

Figure 9:
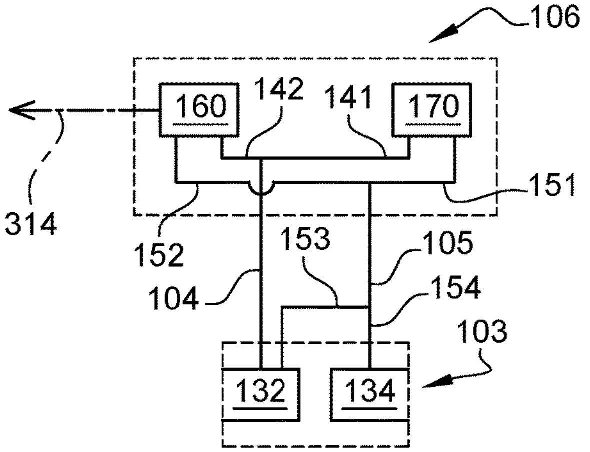
FIG. 9 is a schematic view, similar to FIG. 3, illustrating a second alternative embodiment of the detection device and of the control circuit board of this access door, as well as the various lines allowing the transfer between the detection device and the board.
Figure 10:
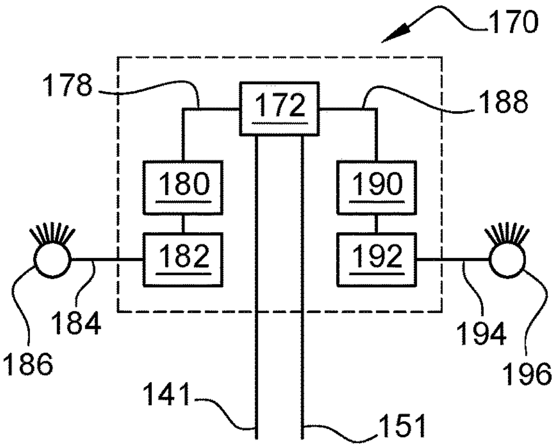
FIG. 10 is a schematic view, similar to FIG. 4, illustrating on a larger scale the structure of the control circuit board of FIG. 9.

FIGS. 9 and 10 illustrate a second variant embodiment. In FIGS. 9 and 10 the component parts, which are similar to those of the first variant embodiment, are allocated the same reference numbers plus 100.

In this second variant, the initial item of information III is identical to information I, so that transfer line 104 is also dedicated to the single transfer of information concerning mechanical detection device 132. As above, this information is carried by a respective electrical signal S'1, similar to signal S1.

On the other hand, the second item of information IV is different from information II in that it corresponds to the activation state, either of the mechanical detection device, or of the contactless sensor. This information IV, which can be called "opto-mechanical", therefore has a so-called active value corresponding to the reference IV(1), if one and/or other of the devices is activated. Furthermore, the so-called inactive value of this information, i.e. reference IV(0), corresponds to an absence of activation of both the mechanical device and the contactless sensor. In other words, unlike the first variant, transfer line 105 is dedicated to the transfer of information relating to both mechanical detection device 132 and contactless sensor 134. As above, this information is carried by an electrical signal S'2, similar to signal S2.

Structurally, line 104 is similar to line 4, in that it has two downstream branch lines 141 and 142. Furthermore, line 105 includes, in addition to the two downstream branch lines 151 and 152, two upstream branch lines 153 and 154. These extend respectively from mechanical detection device 132 and from contactless sensor 134. Finally, control circuit board 106 is identical to that of the first variant, in particular as regards the structure of control unit 160 and of diagnostic unit 170.

Just as in the first variant, as soon as at least one detection device 132 or 134 is activated, each corresponding electrical signal S'1 or S'2 reaches its peak value. Consequently, each corresponding item of information III or IV changes to its active value. Control unit 160 then recognizes this situation, so that it initiates the opening of the door.

Different operational cases can be distinguished, with regard to diagnostic unit 170. First of all, as in the first variant, in the absence of activation of detection devices 132 and 134, each of the electrical signals S'1 and S'2 has a trough value. Consequently, each item of information III and IV has an inactive value, which does not call for any particular action.

Figure 11:
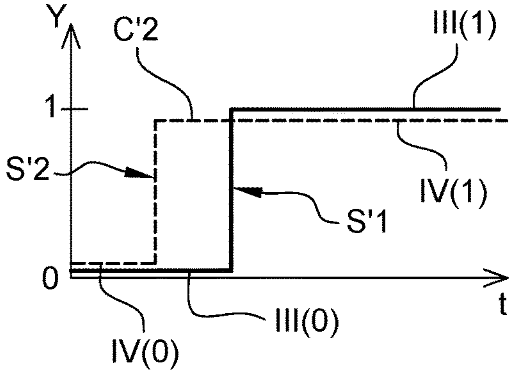
FIG. 11 is a graph, illustrating signals relating to a type of operation of the detection device according to the second variant embodiment, corresponding both to its contactless and mechanical activation.

In the case of an activation of both the mechanical device 132 and the contactless sensor 134, as shown in FIG. 11, electrical signals S'1 and S'2 reach a peak value. Under these conditions, each item of information has an active value, represented respectively by III(1) and IV(1) in FIG. 11. Moreover, advantageously, electrical signal S'2 reaches its peak value before electrical signal S'1, to define a preliminary peak C'2, appearing before the peak of the other signal S'1. As in the first variant, FIG. 11 indicates proper operation of both contactless and mechanical detection devices.

Figure 12:
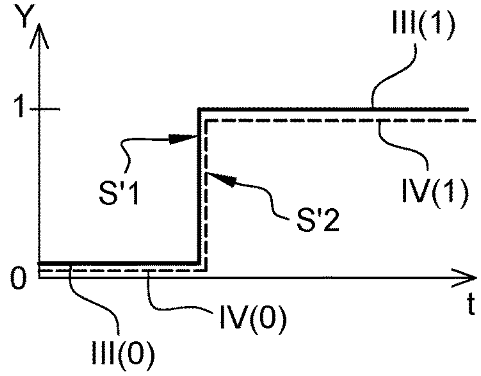
FIG. 12 is a graph, similar to FIG. 11, illustrating signals relating to another type of operation of the detection device, corresponding to mechanical activation but to an absence of contactless activation.

In FIG. 12, signal S'1 presents the same profile as in FIG. 11. On the other hand, signal S'2 is different from that of FIG. 11, in that it is devoid of a preliminary peak C'2. Consequently, the diagnostic unit, which identifies the absence of this preliminary peak, concludes that the contactless sensor has not been activated. This is because the transition of information IV to its active value IV(1) is initiated by the sole activation of the mechanical device. As in the first variant above, the diagnostic unit immediately concludes that there is a malfunction of the contactless sensor. Similar to the first variant, this situation may be the subject of different alerts for the operator.

Figure 13:
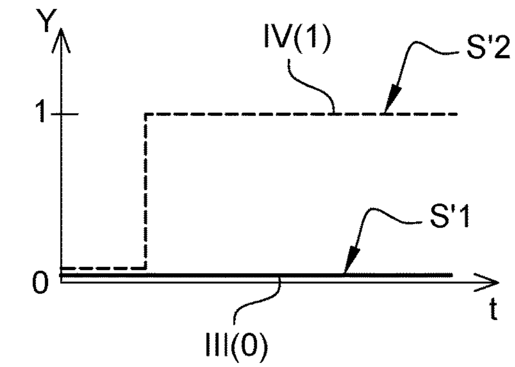
FIG. 13 is a graph, similar to FIG. 12, illustrating signals relating to yet another type of operation of the detection device, corresponding to contactless activation but to an absence of mechanical activation.

In FIG. 13, signal S'2 presents the same profile as in FIG. 11. On the other hand, signal S1 remains at its trough value, corresponding to an inactive value III(0) of information III. As in the first variant, the diagnostic unit identifies that the mechanical device has not been activated, without concluding that it is malfunctioning. The management of this situation can be implemented in the same way as in the first variant, with reference to FIG. 8.

The detection devices, in accordance with this second variant of the invention, have specific advantages, in that they can be easily integrated into an existing transport vehicle. In other words, they allow a convenient "upgrade" of the transport vehicle. Thus it is possible to replace a detection device of a purely mechanical type with an all-mechanical detection device, in accordance with the invention, by taking advantage of transfer line 105.

Figure 14:
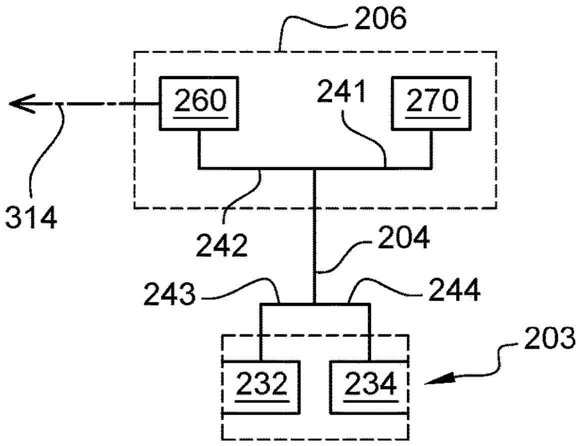
FIG. 14 is a schematic view, similar to FIG. 3, illustrating a third alternative embodiment of the detection device and of the control circuit board of this access door, as well as the various lines allowing the transfer between the detection device and the board.
Figure 15:
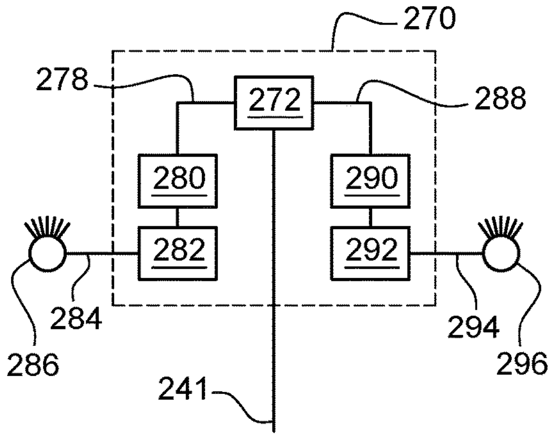
FIG. 15 is a schematic view, similar to FIG. 4, illustrating on a larger scale the structure of the control circuit board of FIG. 14.

FIGS. 14 and 15 illustrate a third alternative embodiment. In these FIGS. 14 and 15 the component parts, which are similar to those of the first variant embodiment, are allocated the same reference numbers plus 200.

This third variant differs from the first two variants above, in particular in that a single transfer line 204 is provided. From a structural point of view, this line 204 comprises two upstream branch lines 243 and 244, which respectively extend from mechanical detection device 232 and from contactless sensor 234. Furthermore, this line comprises two downstream branch lines 242 and 241, which connect respectively to control unit 260 and to diagnostic unit 270. Finally, control circuit board 206 is identical to that of the first two variants, as regards the structure of control unit 260 and diagnostic unit 270.

In this third variant, as for the first variant above, each item of information V and VI corresponds to the activation state of a single detection device, respectively mechanical 232 or contactless 234, but does not take into account the activation state of the other device. On the other hand, unlike the first variants, single line 204 conveys a single electrical signal, denoted S", from detection device 203 to control circuit board 206. As opposed to the variants above, in which each item of information is carried by a respective electrical signal, this single electrical signal S" carries the two items of information V and VI.

Unlike the first two variants, diagnostic unit 270 cannot compare the signals, in order to distinguish the information which indicates mechanical activation from that indicating contactless activation. Under these conditions, in this third variant, this identification is carried out thanks to the nature of the single electrical signal S". In practice, this signal is advantageously allocated by means of different electrical signatures, one of which corresponds to information V of the mechanical type and the other of which corresponds to information VI of the contactless type. These electrical signatures, which are known per se, can be of any suitable type. Note that this definition of "different signatures" includes the possibility that one of the activations is not affected by means of a particular signature.

Figure 16:
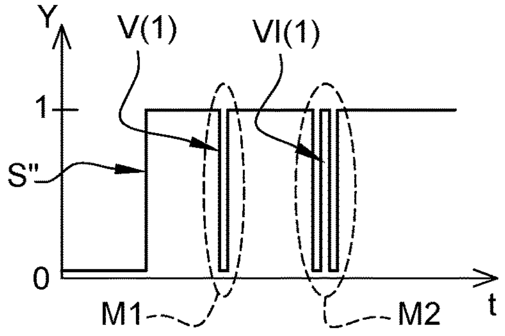
FIG. 16 is a graph, illustrating signals relating to a type of operation of the detection device according to the third variant embodiment, corresponding both to its contactless and mechanical activation.
Figure 17:
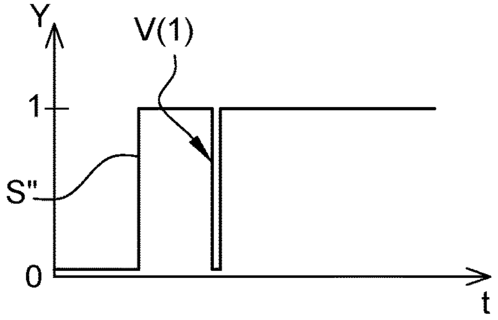
FIG. 17 is a graph, similar to FIG. 16, illustrating signals relating to another type of operation of the detection device, corresponding to mechanical activation but to an absence of contactless activation.
Figure 18:
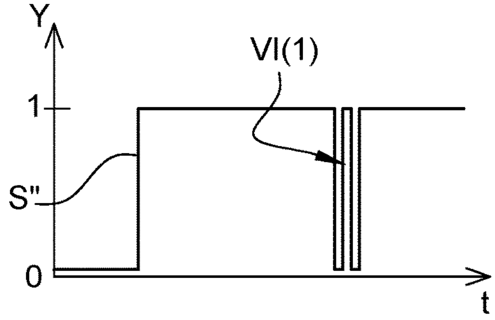
FIG. 18 is a graph, similar to FIGS. 16 and 17, illustrating signals relating to yet another type of operation of the detection device, corresponding to contactless activation but to an absence of mechanical activation.

In this third variant, as shown in FIGS. 16 to 18, a first electrical signature is represented by a first pattern M1 of electrical signal S", corresponding to a drop in the signal immediately followed by a rise. A second electrical signature is represented by a second pattern M2 of this signal, corresponding to a repetition of the first pattern, namely the succession of a first fall, a first rise, a second fall and finally a second rise. Alternatively, the order of these signatures may be reversed. It should be emphasized that, in this third variant, the active value V(1) and VI(1) of each item of information corresponds, not to a peak value of the electrical signal as in the first two variants, but to the occurrence of the one or other of patterns M1 and M2.

We find the same operational scenarios as above. Referring to FIG. 16, electrical signal S" comprises the two target patterns M1 and M2, which means that each item of information has its active value V(1) and VI(1). We therefore conclude that the detection device is working properly, in both mechanical and contactless terms.

With reference to FIG. 17, electrical signal S" comprises only the target pattern M1, but not pattern M2. This means that only the mechanical information V has its active value V(1), but on the other hand that the contactless information VI has its inactive value VI(0). Therefore, as above, the diagnostic unit 270 concludes that the contactless sensor has malfunctioned. Similar to the first variants, this situation may be the subject of different alerts for the operator.

With reference to FIG. 18, electrical signal S" includes only the target pattern M2, but not pattern M1. This means that only contactless information VI has its active value VI(1), but on the other hand that mechanical information V has its inactive value V(0). Consequently, as above, diagnostic unit 270 identifies that mechanical device 232 has not been activated, without however concluding that it is malfunctioning. The management of this situation can be implemented in the same way as in the first variant, with reference to FIG. 8.

This third variant has specific advantages, particularly in economic terms. In fact, it makes it possible to simplify the wiring and to reduce the overall number of wires, so that the associated costs are lower. In addition, the assembly of the component parts of this third variant would be faster in door leaf production lines.

The invention is not limited to the examples described and represented.

Only detection device 3, 103, 203, in accordance with the invention, fitted to the outer side 22 of door leaf 20 has been described above. Provision can also be made for another detection device, also in accordance with the invention, to be provided on the inner side 24 of this same leaf. This interior detection device is then associated with the same mechanical devices as exterior detection device 3, 103, 203. In particular, the various transfer lines, both inside and outside, are connected to control circuit board 6. In operation, it should be ensured that, in all cases, this board is capable of clearly distinguishing between the analysis of the interior detection device and that of the exterior detection device.

Furthermore, the use of a detection device according to the invention on a transport vehicle door has been described above. The invention can also be applied to landing doors, also called platform screen doors, which are equipped with at least one such detection device.

What is claimed is:

1. An access door, comprising:

a frame delimiting an opening;

at least one leaf movable between an open position, corresponding to a free passage through the opening, and a closed position, wherein the passage through the opening is blocked;

a detection device that includes a mechanical device configured to detect pressure on the mechanical device and a contactless sensor configured to detect a presence in a vicinity of the detection device, wherein the detection device is electrically coupled to a control circuit configured to:

control movement of the at least one leaf between the open position and the closed position based on the pressure that is detected or the presence that is detected;

receive information from the detection device, wherein the information comprises information representative of an activation state of the mechanical device and information representative of an activation state of the contactless sensor; and distinguish a first operational case associated with the detection device from a second operational case associated with the detection device based on the information received from the detection device, wherein, in the first operational case, the mechanical device has malfunctioned, and wherein, in the second operational case, the contactless sensor is used more than the mechanical device.

2. The door according to claim 1, further comprising a malfunction module configured to identify a malfunction of the contactless sensor.

3. The door according to claim 1, further comprising a memory module, the control unit circuit configured to supply the memory module with occurrences relating to activation of the contactless sensor accompanied by an absence of activation of the mechanical device.

4. The door according to claim 1, wherein the detection device is configured to generate an alert to an operator responsive to a predetermined number of malfunctions of the contactless sensor.

5. The door according to claim 1, wherein the door further comprises:

one or more transfer lines configured to transfer the information representative of an activation state of the mechanical device and the information representative of an activation state of the contactless sensor from the detection device toward the control circuit.

6. The door according to claim 5, wherein the control unit circuit is configured to compare the first item of information with the second item of information for a predetermined duration.

7. The door according to claim 5, wherein the first item of information corresponds only to the activation state of the mechanical device, while the second item of information corresponds only to the activation state of the contactless sensor.

8. The door according to claim 5, in which the one or more transfer lines comprise a single transfer line configured to convey a single electrical signal carrying both the first item of information and the second item of information from the detection device towards the control circuit.

9. The door according to claim 8, wherein the control circuit is configured to identify different signatures carried by the single electrical signal with each of the signatures corresponding to a different one of the first and second items of information.

10. The door of claim 5, wherein the control circuit is further configured to identify the malfunction of the contactless sensor responsive to the information indicating activation of the mechanical device but an absence of activation of the contactless sensor.

11. The door according to claim 1, wherein the control circuit is further configured to:

determine a percentage of mechanical activation of the mechanical device across a time domain based on the information.

12. The door according to claim 11, wherein the control circuit is further configured to:

determine a variation in the percentage of mechanical activation of the mechanical device across the time domain, and wherein distinguishing the first operational case from the second operational case is further based on the determined variation.

13. An access door, comprising:

a leaf configured to transition between an open position and a closed position;

a detection device comprising a mechanical device configured to generate a first signal associated with a pressure applied to the mechanical device, and a contactless sensor configured to generate a second signal associated with a presence detected within a vicinity of the detection device, wherein the leaf is electrically coupled to the detection device and configured to transition between the open position and the closed position based on the first signal or the second signal; and a control circuit electrically coupled to the detection device, wherein the control circuit is configured to:

control movement of the leaf between the open position and the closed position;

determine a variation in a percentage of mechanical activation of the mechanical device across a time domain based on the first signal and the second signal; and distinguish a first operational case of the detection device, wherein the mechanical device has malfunctioned, from a second operational case of the detection device, wherein users favor the contactless sensor over the mechanical device, based on the variation in the percentage of mechanical activation of the mechanical device.

14. A system, comprising:

an access door, comprising a leaf configured to transition between an open position and a closed position;

a button configured to generate a first signal associated with a pressure applied to the button, wherein the first signal is configured to cause the leaf of the access door to transition between the open position and the closed position;

a contactless sensor configured to generate a second signal associated with a presence detected within a vicinity of the button, wherein the second signal is configured to cause the leaf of the access door to transition between the open position and the closed position; and a control circuit electrically coupled to the button and the contactless sensor, wherein the control circuit is configured to:

receive the first signal from the button;

receive the second signal from the contactless sensor;

control movement of the leaf between the open position and the closed position based on the first or second signal;

determine a variation in a percentage of mechanical activation of the button across a time domain based on the first signal and the second signal; and distinguish a first operational case, wherein the button has malfunctioned, from a second operational case, wherein users favor the contactless sensor over the button, based on the variation in the percentage of mechanical activation of the button.

15. The system of claim 14, wherein the control circuit is further configured to:

determine a gradient of the percentage of mechanical activation; and compare the determined gradient to a predetermined threshold, wherein distinguishing the first operational case from the second operational case is further based on the comparison.

* * * * *